United States Patent

Gill

[11] Patent Number: 5,944,460
[45] Date of Patent: Aug. 31, 1999

[54] ANNULAR HOLE CUTTER

[75] Inventor: Jeffrey Steven Gill, Davison, Mich.

[73] Assignee: Hougen Manufacturing, Inc., Swartz Creek, Mich.

[21] Appl. No.: 09/065,945

[22] Filed: Apr. 24, 1998

Related U.S. Application Data

[60] Provisional application No. 60/044,952, Apr. 25, 1997.

[51] Int. Cl.⁶ ................................................... B23B 41/02
[52] U.S. Cl. ........................... 408/204; 408/206; 408/703
[58] Field of Search .................... 408/204, 206, 408/207, 703

[56] References Cited

U.S. PATENT DOCUMENTS

| | | |
|---|---|---|
| 3,765,789 | 10/1973 | Hougen . |
| 4,538,944 | 9/1985 | Hougen .................................. 408/204 |
| 4,557,641 | 12/1985 | Hougen . |
| 4,573,838 | 3/1986 | Omi et al. ................................ 408/204 |
| 4,586,857 | 5/1986 | Ohmi ....................................... 408/204 |
| 4,767,245 | 8/1988 | Shoji et al. . |
| 4,813,819 | 3/1989 | Hougen .................................. 408/204 |
| 4,871,287 | 10/1989 | Hougen .................................. 408/204 |
| 4,952,102 | 8/1990 | Hougen .................................. 408/204 |
| 5,145,296 | 9/1992 | Hougen .................................. 408/1 R |
| 5,217,334 | 6/1993 | Miyazaki et al. . |
| 5,281,060 | 1/1994 | Strange et al. .......................... 408/204 |

*Primary Examiner*—Andrea L. Pitts
*Assistant Examiner*—Adesh Bhargava
*Attorney, Agent, or Firm*—Howard & Howard

[57] ABSTRACT

The present invention discloses an annular hole cutter particularly useful for cutting railroad rails. Railroad rails are extremely hard and normally require drills or cutters which have carbide inserts. The present invention provides uniquely designed cutter with an improved cutter geometry, flute design and thin wall construction to allow the annular cutter to be used with a lower horsepower drill motor making the drill motor portable resulting in a portable rail cutting system.

20 Claims, 1 Drawing Sheet

U.S. Patent   Aug. 31, 1999   5,944,460
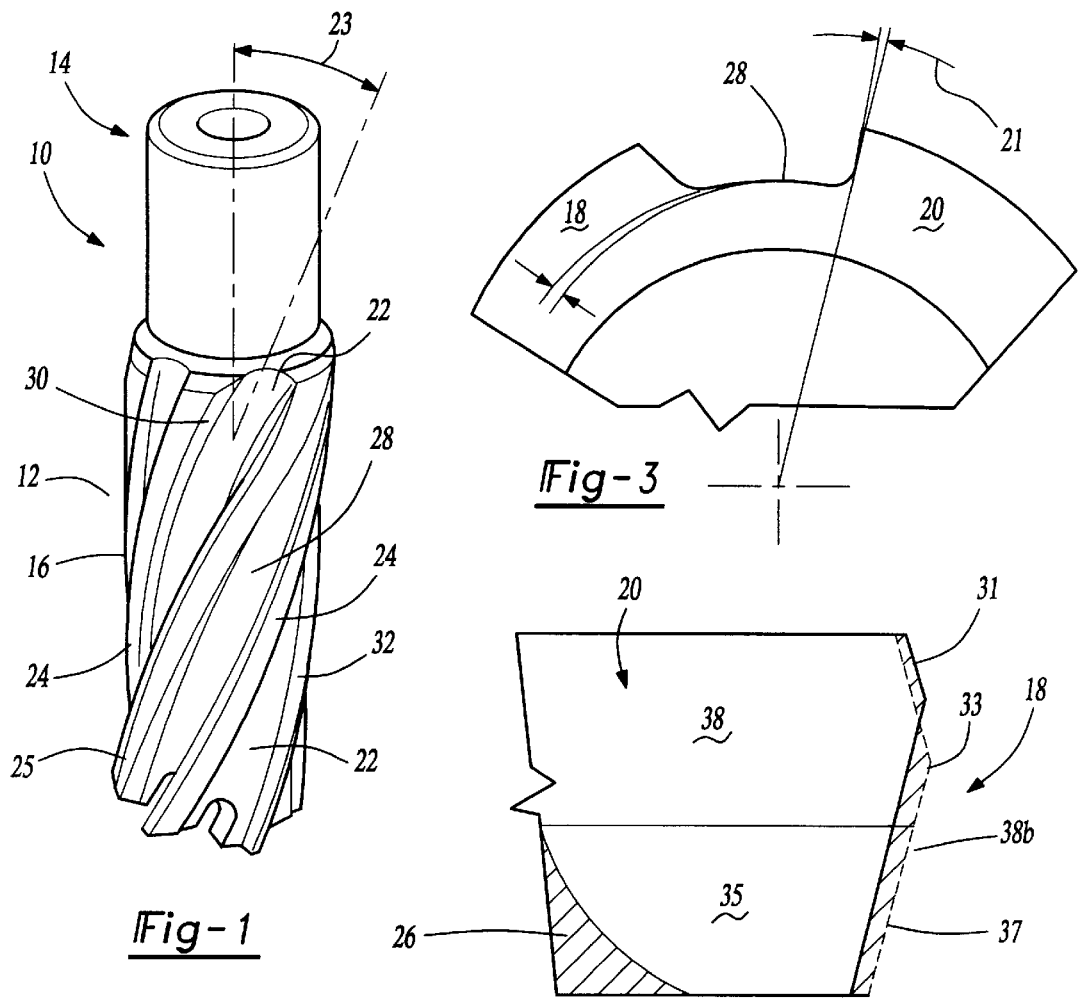
Fig-1
Fig-3
Fig-4
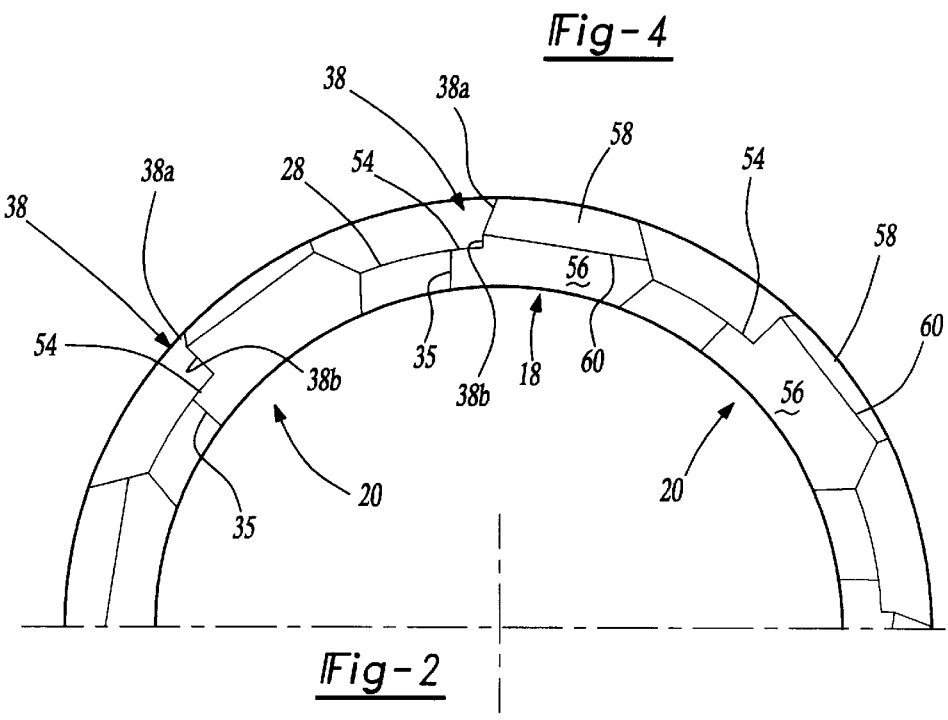
Fig-2

ANNULAR HOLE CUTTER

This application claims priority of U.S. Provisional Application No. 60/044,952, filed on Apr. 25, 1997.

BACKGROUND

The present invention relates to annular hole cutters and more particularly to annular hole cutters used to cut holes in railroad rails for receipt of a connecting bolt.

In repairing or assembling railroad rails, it is common to drill or cut holes in a pair of rails with a drill bit to interconnect the rails with a steel plate. The plate has mating holes and a fastener, such as a bolt, which is inserted through the plate and rail and connected with a nut. Drilling or cutting holes in railroad rails presents numerous problems. The rails are made of very hard steel that is extremely difficult to cut through. Typically, the drilling or cutting can take a long time, for example two to three minutes with a spade bit, forty to forty-five seconds with an indexable carbide cutter. Also the process of cutting the rails quickly dulls the cutting tool or drill requiring either resharpening or replacing the tool. Resharpening can be difficult since the work on the rails may be at remote locations and replacement can be expensive.

The typical drill that is used to form holes in rails is a spade drill or indexable carbide cutter with carbide inserts. Spade drills are slow and require a lot of horsepower to power the spade drill through the rail. This is due to the spade drill cutting all of the steel to form hole in the rail. The power source commonly used with spade drills is a very large gas powered drill motor. These gas powered drill motors are not portable and must be mounted upon a vehicle of some sort to move them along the rail. The gas powered drills are very costly to purchase and to operate when compared to portable gas powered rail cutters and are cumbersome to operate because of the size of the gas powered drill. Additionally, the time required to drill the hole is a problem. Because all the steel is being removed from the rail to form the hole, more time is needed to complete each hole. These drills will typically become dull after one to ten holes have been cut. Users of these spade drills will typically dispose of them and use another new spade drill. An advantage to spade drills is that they are less expensive than known annular hole cutters with carbide inserts. The cost of a spade drill is typically about $7 to $10 and an indexable carbide cutter will cost about $150 and $7 to $10 for the carbide inserts. With these, when the inserts are dulled, they are replaced with new inserts.

Annular hole cutters with brazed carbide inserts are capable of cutting holes in rails more quickly than spade drills and require much less power. Annular hole cutters have a cutter body of a generally inverted cup shape and a shank for attaching the cutter to a drill motor. The end of the cutter body has cutting teeth spaced about it that cut a groove or kerf into the rail. The only steel that is being removed is the steel from the kerf which is being cut by the spaced cutter teeth. When the cut is completely through the rail, a cylindrical slug is left that is ejected from the cavity of the cutter body. The assignee of the present invention has invented numerous annular hole cutters including for example U.S. Pat. No. 4,813,819 and is the owner through assignment of other annular hole cutters.

Because of the minimum amount of steel removed by the annular cutter, lower horsepower is required to power the cutter through the rail. For example, for a typical rail drill, only one horsepower is needed, whereas in spade drills five to ten horsepower is required. Because of the lower horsepower requirements, portable rail drills can be used to power the cutters. An example of a portable rail drill is disclosed in U.S. Pat. No. 5,203,650, which is assigned to the assignee of the present invention. These portable rail drills are much easier to handle than the larger gas powered drills, are less expensive to purchase and less expensive to maintain.

The problem with annular cutters is their cost and the difficulty in resharpening them. They require carbide inserts in order to effectively cut through the hard steel of the rail. Unlike a spade drill which has a pair of cutting edges, annular cutters have a number of teeth, usually 4 to 6 teeth and each requires an insert. This increases their cost and increases the difficulty in resharpening them. It is difficult to have the proper equipment to resharpen these inserts in remote locations. They must be stored and brought to a resharpening center to be resharpened. A task that is not popular among rail workers. Due to their expense, they are not readily disposable either.

BRIEF SUMMARY OF THE INVENTION

The present invention overcomes the above problems by providing an inexpensive annular hole cutter that doesn't have carbide inserts, but is able to quickly and efficiently cut through the hard steel rails.

The annular hole cutter of the present invention is used primarily for cutting through the web of a railroad rail. Said annular hole cutter having a cutter body with a generally circular cylindrical side wall and a plurality of cutting teeth spaced circumferentially around the end of the side wall. The cutter body circular side wall has a narrow width of less than three sixteenth inches (3/16) and in the preferred embodiment has a width of one eight inch (1/8). A plurality of flutes extend upwardly around the side wall from the cutting teeth with the flutes having a depth of about one half (1/2) the width of the curve cut by the cutting teeth. The flutes have a modified helix angle of less than 25°, preferably 15° and a positive cutting rake, preferably 5° positive.

The cutting teeth are separated into a first group and a second group. The first and second groups of teeth are alternately disposed with one tooth of the first group being between two teeth of the second group, etc. The teeth each have at least one cutting edge to cut chips from the curve of a workpiece. The teeth have intersecting back off faces intersecting in a crest that intersects the cutting edge so that the cutting edges cut chips having a width less than the depth of the adjacent flute.

In the preferred embodiment, each of the teeth are divided into two cutting edges with the crest intersecting the outer most cutting edge. The cutting teeth cut three chips over two teeth. The first group of teeth have a cutting edge which cuts a first chip from the workpiece and the second group of teeth have a pair of cutting edges which cut two chips from the workpiece. The chips cut define the width of the curve. The first group of teeth, cut the chip along the outer edge of the curve. The second group of teeth cut chips from the middle and inner portion of the curve. Preferably, there are six to ten teeth and most preferably there are either eight or ten teeth.

Through a combination of the cutting geometry of the cutting teeth, the positive flute cutting angle and the modified helix angle, the annular hole cutter of the present invention can cut quickly and efficiently through the web of railroad rails without the need for carbide inserts. This greatly reduces the cost to manufacture these tools. Further, the performance far exceeds performance of carbide insert annular hole cutters which further reduces the overall cost of such tools. Due to the lower costs to manufacture and the longer life obtained by these cutting tools, users can dispose of them rather than having them re-sharpened for further use.

Other advantages and meritorious features of the present invention will become more fully understood from the following description of the preferred embodiments, the appended claims and the drawings, a brief description of which follows.

DESCRIPTION OF THE DRAWINGS

FIG. 1 is a perspective view of the annular cutter of the present invention.

FIG. 2 is a partial end view of the cutter illustrating the groups of cutting teeth.

FIG. 3 is a flat view of the end of the cutter illustrating the positive flute cutting angel.

FIG. 4 is a partial view of a tooth from the first group and second group to illustrate the cutting angles of these teeth.

DESCRIPTION OF THE PREFERRED EMBODIMENT

The annular cutter of the present invention is shown generally at 10 in FIG. 1. The cutter includes a body 12 and a shank 14. In the preferred embodiment, the cutter tool 10 is made of M-42 high speed steel. The cutter body 12 has a generally inverted cup shape having a side wall 16 the length of which is greater than the thickness of the work piece into which the hole is to be cut. In the present cutter, the preferred length of the cutter body is about one and one quarter inches (1.250") which is slightly longer than the width of the web of the railroad rail which is about one inch (1") thick. The overall length of the cutter 10 including the shank 14 is slightly more than two and one eighth inches (2.125") to about 2.145".

An important factor in the success of the present cutter is the use of a thin wall to make a narrow kerf. The cutter 10 of the present invention cuts a kerf of approximately one eighth inch (⅛"). This means that the wall thickness of the cutter 10 is about one eighth inch (⅛"). This compares to the normal wall thickness of an annular cutter which is about three sixteenth inches (3/16"). The narrower wall thickness substantially reduces the horsepower needed to drive the cutter. Normally, it would be believed that such a narrow wall thickness would result in a very fragile cutter, but because of the other important changes made to a standard annular hole cutter, the narrow wall thickness of the cutter 10 is not fragile and results in a far superior cutter for rail applications. The other critical factors are the use of a reduced flute helix angle, the use of a cutting edge geometry that cuts chips less that the depth of the flute and in particular the cutting of three chips over two teeth, and the use of a positive flute cutting rake to direct the chips away from the wall of the hole being cut. These features result in the ability to use reduced power to drive cutter 10 and results in holes being cut faster, less wear on the cutter, two to four times more holes being cut with a single tool and a cost reduction to manufacture of about one third the cost as compared to current annular rail cutters. Each of these factors will be discussed in greater detail below.

The lower end of side wall 16 has a plurality of circumferentially spaced cutting teeth. In the preferred embodiment of the rail cutter of the present invention, there are eight (8) to ten (10) cutting teeth. The cutting teeth are divided into two groups or sets, the first set designated 18 and the second set being designated 20. The sets of teeth 18 and 20 are alternately arranged so that one tooth 20 is disposed circumferentially between successive teeth 18. A spiral flute 22 extends upwardly around the outer periphery of the cutter adjacent each tooth. The successive flutes 22 are separated by a land 24 at the outer periphery of the cutter. The leading edge of each land 24 is formed with a narrow margin 25. In the disclosed embodiment, this land 25 is approximately twenty thousandths of an inch (0.020") to about thirty thousandths of an inch (0.030"). The portions of the annular side wall 16 of the cutter between the successive teeth 18,20 comprise webs 26. The radially outer face 28 of each web 26 defines the radially inner wall of each flute 22. The depth of the flute 22 is approximately equal to or slightly greater than the thickness of web 26. Each flute includes a circumferentially leading side wall 30 and a circumferentially trailing side wall 32.

As illustrated in FIG. 3, the flute cutting angle is positive and in the preferred embodiment is 2° to 7° and is preferably 5°. See arrow 21 in FIG. 4. This FIG. 4 shows the flute in the flat stage prior to the crests being ground onto the teeth. This positive flute cutting angle is believed to provide better chip discharge in that the chips are discharged away from the wall of the hole and therefore do not drag along the wall of the hole as they would if the flute cutting angle were negative. The flute also has a flute helix angle of approximately fifteen degrees (15°). See arrow 23 in FIG. 1. This low helix angle reduces the wear on the cutter teeth and provides a stronger cutting hole edge. Standard flute helix angles of applicant's annular cutters are much greater and in the range of about twenty five degrees (25°).

The cutter illustrated is generally of the type disclosed in U.S. Pat. Nos. 5,145,296; 4,952,102; 4,871,287; 4,813,819; 4,632,610; and Reissue U.S. Pat. No. 28,416, each of which is incorporated herein by reference. The cutter 10 of the present invention has two cutting edges, the inner cutting edge 35 and outer cutting edge 38. In the preferred embodiment cutting edge 35 extends across the full thickness of the web 26. The edge 38 is located at the lower end of the trailing face 32 of flute 22 and is spaced rearwardly from cutting edge 35 by a shoulder 54 at the lower end of flute 22.

Each of the teeth 18,20 have back-off faces that divide the outer cutting edges 38 into two portions 38a and 38b. Teeth 18 and 20 have back-off faces 56,58. The radially inner back-off face 56 inclines axially upward and radially inwardly while the radially outer back-off face 58 inclines axially upwardly and radially outwardly. In addition, each of these back-off faces inclines upwardly from its respective cutting edges in circumferential direction to a slight extent of about 8° to 10°, to provide the necessary clearance for the cutting edges as the tool is rotated. The two back-off faces 56,58 intersect in a downwardly extending crest 60 which intersects the radially outermost cutting edge 38 to divide it into radially outer edge portion 38a and radially inner edge portion 38b. The radial inclination of back-off face 58 is in the range of between 5° to 35° to the horizontal and is preferably 10°. The inner back-off face 56 inclines radially to the horizontal at an angle of between −3° to +25°, and preferably about 15°. As a result of the inclination of back-off faces 56,58 in both a radial and a circumferential direction, the cutting edges are staggered circumferentially, see FIG. 2 and vertically when viewed in FIG. 4. The vertical stagger is approximately four thousandths of an inch (0.004"), nearly half of the normal stagger.

It will be observed that the crest 60 on the teeth 18 is disposed radially inwardly of the crest 60 on the teeth 20. The radially staggered crests 60 on the successive teeth of the cutter result from the fact that in each tooth 18 the back-off face 58 is vertically relieved throughout its radial extent upwardly relative to the back-off face 58 of each tooth 20. This in itself would result in crest 60 of each tooth 18 being disposed radially inwardly relative to crest 60 of each tooth 20. The back-off face 56 of each tooth 20 is likewise relieved throughout its radial extent upwardly relative to the back-off face 56 of each tooth 18. The relieving of the back-off faces 56 of the teeth 20 displaces the crests 60 radially outwardly from the crests 60 on teeth 18 an additional extent.

As illustrated in FIG. 4, the annular cutter 10 of the present invention cuts three chips over two teeth 18 and 20. The tooth 20 cuts a single chip 31 at edge portion 38a and the tooth 18 cuts two chips 33 and 35 on edge portion 38b of cutting edge 35. In the preferred embodiment, the three chips cut are all narrower than the flute depth to permit unobstructed discharge of the chips from the respective adjoining flutes. This unobstructed discharge reduces the power requirements of the drill since the chips are not clogging in the flutes. In the preferred embodiment, the flutes are approximately one half (½) the width of the kerf or groove being cut. Therefore, the respective width of each cutting edge is less than one half (½) the kerf or groove being cut. The kerf being cut is approximately one eighth inch (⅛") due to the thin wall of the cutter. The desired flute depth is one sixteenth inch (1/16")+0.001/+0.005 inches.

The foregoing detailed description shows that the preferred embodiments of the present invention are well suited to fulfill the objects of the invention. It is recognized that those skilled in the art may make various modifications or additions to the preferred embodiments chosen herein to illustrate the present invention, without departing from the spirit of the present invention. Accordingly, it is to be understood that the subject matter sought to be afforded protection should be deemed to extend to the subject matter defined in the appended claims, including all equivalents thereof.

What is claimed is:

1. An annular hole cutter for use in cutting holes in a workpiece, said annular cutter cutting the hole by cutting a kerf and resulting slug, said annular cutter comprising:

a cutter body having a generally circular cylindrical side wall with a plurality of cutting teeth spaced circumferentially around the end thereof, said cutter body circular side wall has a narrow width of less than 3/16 inches;

a plurality of flutes extending upwardly around the side wall from the cutting teeth, said flutes having a depth of about ½ the width of the kerf cut by the cutting teeth, said flutes having a helix angle of less than twenty five degrees and a positive cutting rake;

said cutting teeth being separated into a first group and second group, said first and second groups of teeth being alternately disposed with one tooth of the first group being between two teeth of the second group, said teeth each having at least one cutting edge to cut chips from the kerf of a workpiece, said teeth having intersecting back-off faces intersecting in a crest that intersects one of the cutting edges, said cutting edges cutting chips having a width less than the depth of the adjacent flute.

2. The annular hole cutter of claim 1, wherein said cutter body circular wall thickness is about one eighth inch (⅛).

3. The annular hole cutter of claim 1, wherein said helix angle is about 15° with respect to the longitudinal centerline of said cutter.

4. The annular hole cutter of claim 1, wherein said flute cutting rake is about 5° positive.

5. The annular hole cutter of claim 1, wherein said cutting teeth cut three chips over two teeth.

6. The annular hole cutter of claim 5, wherein said first group of teeth have a cutting edge which cuts a first chip from said workpiece and said second group of teeth have a pair of cutting edges which cut two chips from said workpiece, said chips cut defining the width of said key.

7. The annular hole cutter of claim 1, wherein said cutter has six to ten teeth.

8. The annular hole cutter of claim 1, wherein said cutter has eight teeth.

9. The annular hole cutter of claim 1, wherein said cutter has ten teeth.

10. The annular hole cutter of claim 1, wherein said teeth are divided into two cutting edges with said crest intersecting the outer most cutting edge.

11. An annular cutter for cutting holes in hard narrow materials, said annular cutter cutting a kerf from the materials and a resultant slug, said annular cutter comprising:

a cutter body having a generally hollow cylindrical shape with a shank extending from one end and cutting teeth spaced about the opposite end, a plurality of flutes extending from the cutting teeth along the cutter body, said cutting teeth having cutting edges to cut chips from the hole with the chips cut being less than the depth of the flutes, said cutter body have a narrow, circular wall to cut a narrow kerf;

said flutes having a helix angle and a positive flute cutting angle to direct the chips cut by said cutting teeth away from the walls of the kerf to reduce the power required to drive the cutter and to reduce wear of the cutting teeth.

12. The annular hole cutter of claim 11, wherein said cutter body circular wall thickness is about one eighth inch (⅛).

13. The annular hole cutter of claim 11, wherein said helix angle is about 15° with respect to the longitudinal centerline of said cutter.

14. The annular hole cutter of claim 11, wherein said flute cutting rake is about 5° positive.

15. The annular hole cutter of claim 11, wherein said cutting teeth cut three chips over two teeth.

16. The annular hole cutter of claim 15, wherein said first group of teeth have a cutting edge which cuts a first chip from said workpiece and said second group of teeth have a pair of cutting edges which cut two chips from said workpiece, said chips cut defining the width of said kerf.

17. The annular hole cutter of claim 11, wherein said cutter has six to ten teeth.

18. The annular hole cutter of claim 11, wherein said cutter has eight teeth.

19. The annular hole cutter of claim 11, wherein said cutter has ten teeth.

20. The annular hole cutter of claim 11, wherein said teeth are divided into two cutting edges with said crest intersecting the outer most cutting edge.

* * * * *